United States Patent
Whittaker

[11] Patent Number: 5,971,349
[45] Date of Patent: Oct. 26, 1999

[54] MACHINERY MOUNT ANCHOR BASE

[75] Inventor: Wayne H. Whittaker, Horton, Mich.

[73] Assignee: Unisorb Inc., Jackson, Mich.

[21] Appl. No.: 08/996,719

[22] Filed: Dec. 23, 1997

[51] Int. Cl.$^6$ .................................................. F16M 1/00
[52] U.S. Cl. ........................................ 248/678; 248/188.4
[58] Field of Search .................................. 248/678, 679, 248/680, 637, 638, 677, 673, 650, 674, 648, 636, 544, 599, 645, 699, 662–664, 288.31, 346.01, 499, 500, 188.4; 52/169.9, 167.2

[56] References Cited

U.S. PATENT DOCUMENTS

| | | | |
|---|---|---|---|
| 331,460 | 12/1885 | Suckow | 254/101 |
| 842,641 | 1/1907 | Fernau | 248/188.4 |
| 1,102,792 | 7/1914 | Patton | 254/133 R |
| 1,864,150 | 6/1932 | Shields | 248/544 |
| 1,925,573 | 9/1933 | Schurman | 52/699 |
| 2,010,299 | 8/1935 | Gray | 248/188.4 |
| 2,940,297 | 6/1960 | Mayer | 403/20 |
| 2,970,236 | 1/1961 | Paul et al. | 310/91 |
| 3,268,996 | 8/1966 | Luketa | 248/678 |
| 3,356,324 | 12/1967 | Attermeyer | 248/650 |
| 3,516,629 | 6/1970 | Say | 248/678 |
| 3,601,345 | 8/1971 | Johnson | 248/24 |
| 3,978,574 | 9/1976 | Stith, Jr. | 29/407 |
| 4,061,298 | 12/1977 | Kober | 248/23 |
| 4,085,914 | 4/1978 | Gavin | 248/678 |
| 4,117,997 | 10/1978 | Gitzendanner | 248/20 |
| 5,000,416 | 3/1991 | Fantasia | 248/650 |
| 5,573,220 | 11/1996 | Whittaker et al. | 248/638 |
| 5,590,494 | 1/1997 | Miller | 52/169.9 |
| 5,823,147 | 10/1998 | Hitchcock, Jr. | 122/510 |
| 5,833,206 | 11/1998 | Peacock | 248/677 |
| 5,842,678 | 12/1998 | Svejkovsky | 248/650 |

*Primary Examiner*—Ramon O. Ramirez
*Assistant Examiner*—Tan Le
*Attorney, Agent, or Firm*—Young & Basile, P.C.

[57] ABSTRACT

An anchor base for mounting machinery supports wherein fasteners extend through holes defined in the base. The base holes are provided with a concave countersunk surface which receives a complementary shaped convex fastener guide permitting the fastener to be obliquely oriented to the plane of the base, and the supporting surface and yet providing an effective holding force. This construction of the anchor base also permits an adapter to be used in conjunction with the base wherein if the supported machinery overlies the machinery support as not to provide access to the regular base mounting holes, a mechanical hold-down force on the base is still possible.

2 Claims, 2 Drawing Sheets

MACHINERY MOUNT ANCHOR BASE

BACKGROUND OF THE INVENTION

1. Field of the Invention

The invention pertains to supports for heavy machinery providing a greater degree of flexibility of installation.

2. Description of the Related Art

Heavy equipment, such as large machine tools, generators, turbines, motors, large fixtures and gauges, presses, rolling mills, and the like, must be accurately supported to permit the desired tolerances and dimensions to be maintained and insure proper operation in accordance with designed specifications. To permit such accurate support of heavy equipment, machine supports are used which are capable of distributing the machine weight and permit minute vertical adjustment while under heavy loads, and which are also capable of damping vibrations. Such mounting equipment may include adjustable wedges, screws, and the like, mounted upon a cast metal base which is supported upon a floor, specially prepared foundation or the like.

The heavy equipment to be supported will include a mounting foot or pad which will rest upon the machinery mount, and it is not unusual for the supported equipment to include a base which extends outwardly from the pad or foot which tends to overlie the machinery mount and restrict access thereto. Accordingly, the design of heavy equipment often renders it difficult to properly utilize known machinery mounts rendering installation difficult.

Adhesives are regularly used to affix the machinery mount to the supporting floor or foundation, but it is often desired to augment the adhesive mounting with fasteners and the like, but installation of such fasteners is often difficult or impossible to achieve because of interference with the base of the supported equipment.

OBJECTS OF THE INVENTION

It is an object of the invention to provide a machinery mount having a base which permits fasteners to extend therethrough into a supporting surface and wherein the fasteners may be obliquely related to the anchor mount supporting surface to permit access around the supported equipment base.

Another object of the invention is to provide a machinery mount capable of permitting fasteners to be inserted therethrough obliquely related to the plane of the supporting surface wherein the value of the fastener force vectors tend to be self-aligning to achieve optimum holding forces.

Yet another object of the invention is to provide a machinery mount capable of being used with an adapter permitting fasteners to be inserted therethrough offset from the machinery mount body to permit equipment base clearance and yet an effective vertical holding force on the machinery mount is achieved.

SUMMARY OF THE INVENTION

A machinery mount includes a base which rests upon the supporting floor or foundation. The base will normally be of a flat configuration defining a horizontal plane. The mounting structure supported upon the base may take a variety of forms. Usually, this supporting structure is vertically adjustable and may use wedges, screws or the like to raise or lower a support plate which engages the base or foot of the supported equipment. A typical type of machinery mount with which the inventive concepts may be used are sold by the assignee under the trademark FIXATOR®.

The machinery mount base includes lateral sides as well as upper and lower surfaces, and a pair of mounting openings are located adjacent the base lateral sides extending through the upper and lower surfaces for receiving a fastener which imbeds into the supporting surface or foundation.

In the practice of the invention, the base upper surface surrounding the fastener openings is countersunk or recessed with a concave surface, preferably a spherical surface, but could be of a cylindrical configuration. When utilizing a fastener extending through the openings, a fastener guide having a convex surface complementary to the base concave recess is located within the recess capable of a swiveling action within the recess due to the complementary surface configurations of the recess and the guide. A hole extends through the guide convex surface of a large enough diameter to receive the size fastener to be used, and the opening within the base is of an oblong configuration so as to accommodate an elongated fastener, such as a bolt or screw, extending through the fastener guide hole and base opening at a variety of oblique angular orientations to the plane of the base lower surface.

Accordingly, the use of the convex surfaced fastener guide permits an elongated fastener such as a screw, bolt, cement setting screw set, or the like, to extend through the guide hole and base opening and tightening of the fastener will force the guide into the base recess. The complementary surface configurations of the base recess and fastener guide permit the fastener to self-align itself with the tension forces within the fastener and the base recess so as not to damage the base and permit the force vectors produced by the tension within the fastener to be efficiently transmitted to the machinery mount base. The vector perpendicular to the base supporting surface is that force which prevents movement of the base and machinery mount relative to the supporting surface.

Because the spherical or cylindrical fastener guide permits the fastener to be inserted through the base opening at an oblique angle, if necessary, this oblique angle will usually permit access to the fastener by the drive wrench, hammer or other fastener operator even though the edge of the supported machinery base may extend outwardly from the machinery mount. In this manner, the concave guide configuration permits machinery mounts to be readily installed wherein clearance is not available for installation of the fastener at a perpendicular angle to the supporting surface.

Another feature of the invention lies in the use of an adapter which includes a pair of substantially parallel legs interconnected by a bridge. The free outer ends of the legs are provided with bulbous projections having convex surfaces substantially corresponding to the concave base opening recesses whereby these projections may be received within the recesses.

The adapter legs are of sufficient length as to locate the adapter bridge beyond the base configuration as to rest directly upon the supporting floor or foundation and a hole is located in each of the legs between the leg free end and the bridge, and at a location to clear the machinery mount base permitting a fastener to be inserted through the leg openings pivoting the adapter about the bridge and forcing the legs downwardly into the base recesses. In this manner, the leg fasteners, which are readily accessible as they are located off to the side of the machinery mount, and beyond the configuration of the machinery base, mechanically hold the machinery mount firmly against the supporting floor or foundation in a mechanical manner with or without adhesives. Accordingly, the adapter will permit fasteners to hold the machinery mount base upon the floor or foundation even though the equipment base may extend a substantial distance outwardly from the machinery mount.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
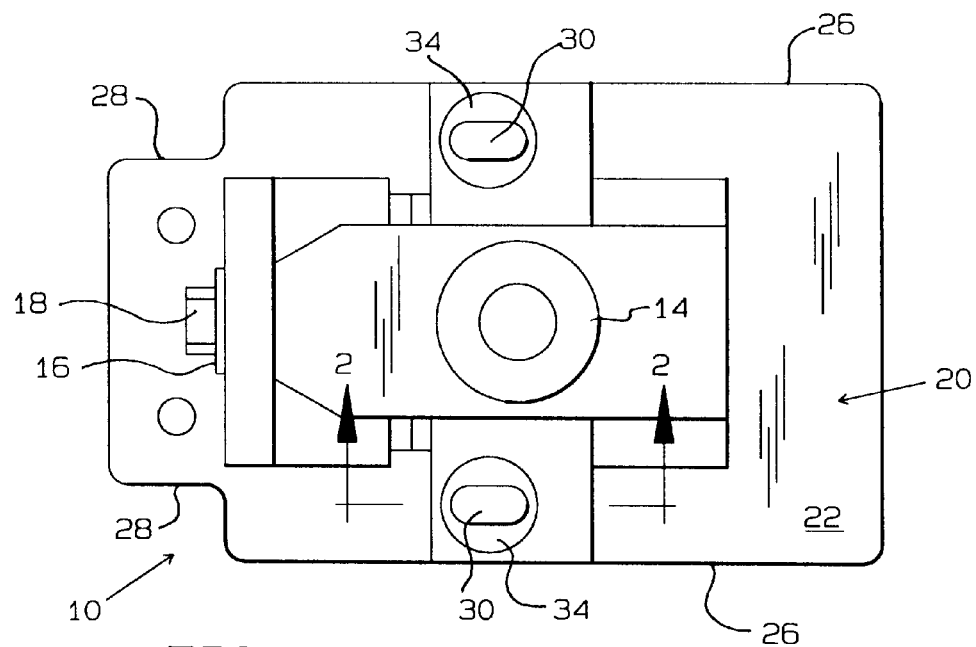
FIG. 1 is a plan view of a machinery mount utilizing the base features in accord with the invention.

A sample of a machinery mount utilizing the base features of the invention is shown at 10 in FIG. 1. The machinery mount 10 is of the type sold by the assignee, Unisorb Inc. of Jackson, Mich., under the trademark FIXATOR®. This type of machinery mount includes a vertical column 12 having a pad 14 constituting the upper surface and the foot or mounting pad of the equipment being supported by the mount 10, not shown, rests upon the pad 14 either directly or indirectly. A screw 16 rotatably mounted within column 12 and rotated by the torque transmitting nut 18 through a wrench or similar tool permits the pad 14 to be raised and lowered by a wedge system located within the column 12.

The machinery mount 10 includes a base 20 integral with the column 12 and the base 20 is usually of a relatively large size as to distribute the supported weight over a relatively large area. The base 20 includes an upper side 22, a lower side 24 of a flat configuration adapted to engage the floor or foundation 25 supporting the mount 10, and its load. Lateral sides 26 are defined on the base 20 and the base may be notched as at 28, if desired.

Figure 2:
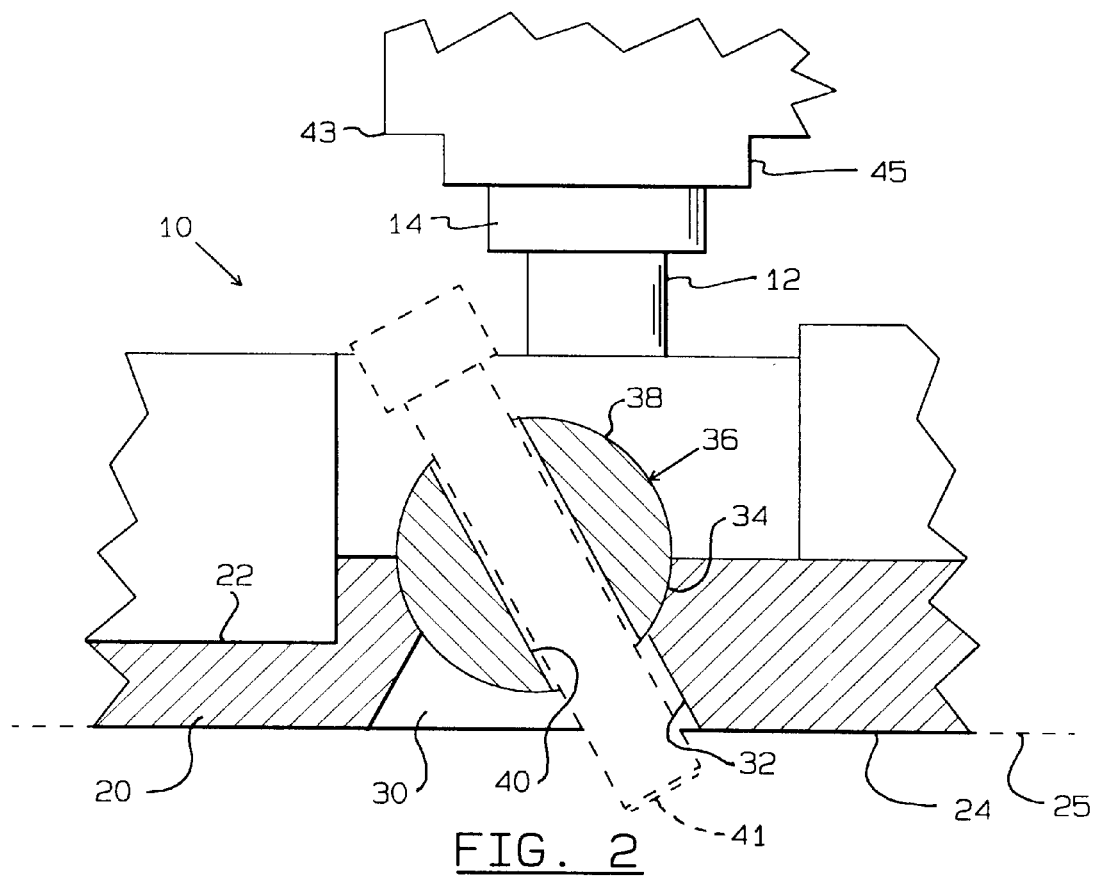
FIG. 2 is an enlarged elevational sectional view as taken along Section 2—2 of FIG. 1 showing a convex washer received within a fastener opening recess.

An opening 30 is defined adjacent each base lateral side 26 and the openings 30 are of a generally oval configuration being slanted at 32, FIG. 2, whereby a fastener inserted through an opening 30 may be obliquely related to the plane of the lower side 24.

Each of the fastener receiving openings 30 is countersunk with a concave recess 34 which is preferably of a spherical configuration, but may be of a cylindrical form within the context of the invention. If the recess 34 is cylindrical, the axis thereof would be parallel to the plane of side 24 and perpendicular to the length of the screw 16.

A fastener guide 36 is located within each recess 34, and, preferably, the guide 36 takes the form of a spherical member having a convex surface 38 complementary in dimension to the base recess 34 in which it is received, as will be appreciated from FIG. 2. The guide 36 includes a fastener receiving hole 40 through which a fastener 41 shown in dotted lines may extend. The fastener 41 will be elongated and may take a number of forms, such as a bolt or screw adapted to be threaded into a concrete imbedded nut, a screw capable of being threaded into a hole drilled in cement, a threaded fastener associated with a variety of masonry attached fastening systems, or the like.

In use, the machinery mount 10 will be located under the foot or pad 45 usually located on the machine to be supported. The edge of the base of the supported machine is represented at 43 in FIG. 2. Prior to positioning the machinery mount 10, an adhesive is often applied to the lower surface 24. By rotation of the screw 16 through nut 18, the weight supporting pad 14 may be vertically adjusted as desired to bear the predetermined weight of the pad 14.

As it is common for the lower edge of the machinery base 43 to extend outwardly from the pad 14 as shown in FIG. 2, the use of the convex guide 36 permits the fastener 42 to be obliquely related to the plane of the base 20 and the lower supporting surface 24 as shown in FIG. 2. Accordingly, it is possible for the head of the fastener 42 to be attached to an appropriate wrench for rotation and tightening. Of course, the oblong configuration of the openings 30 permits a cement drill to enter the opening 30 and prepare an opening for the fastener 42. Tightening of the fastener 42 upon extending through the guide hole 40 firmly engages the complementary surfaces of the guide 36 and the recess 34 whereby the tension forces produced in the fastener 42 will be efficiently applied to the base 20, and the complementary configurations of the guide 36 and recess 34 will permit the guide to self-align itself with the recess and permit an efficient distribution of the fastener force vectors upon the base 20 which are perpendicular to the plane of the base lower side 24. Accordingly, the use of the recess 34 and fastener guide 36 permits a mechanical mounting of the base 20 upon the support surface in addition to the adhesion produced by the adhesive applied thereto.

In some instances, the "overhang" of the machinery base 43 with respect to the machinery mount pad 14 is too great to permit the type of installation described with respect to FIGS. 1 and 2. In such instance, an even greater "offset" assembly is possible by the use of the adapter 44 shown in FIGS. 3 and 4.

The adapter 44 is forged or cast of metal and includes a pair of substantially parallel legs 46 interconnected at their outer ends by the homogeneous bridge 48. The leg free ends 50 each include a downwardly extending projection 52 having a convex surface 54 complementary in configuration to the shape of the base recesses 34. Preferably, the convex surfaces 54 are of a spherical configuration, but as discussed above, could be of a cylindrical form.

Figure 3:
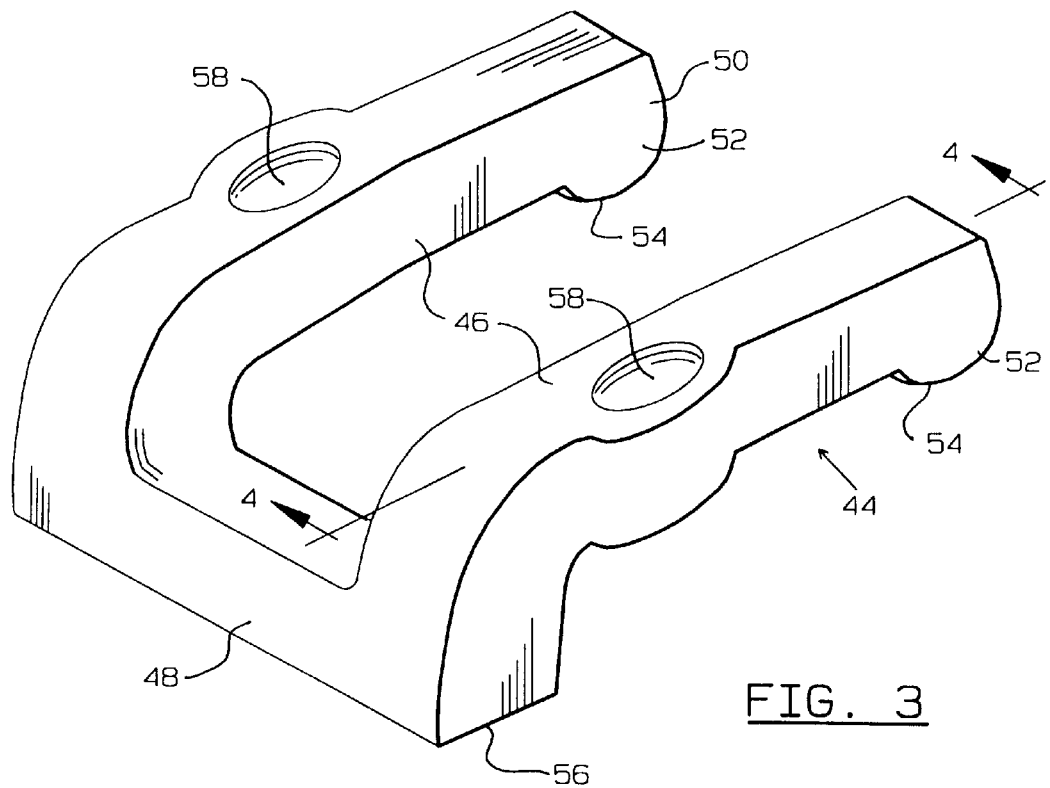
FIG. 3 is a perspective view of an adapter in accord with the inventive concepts.
Figure 4:
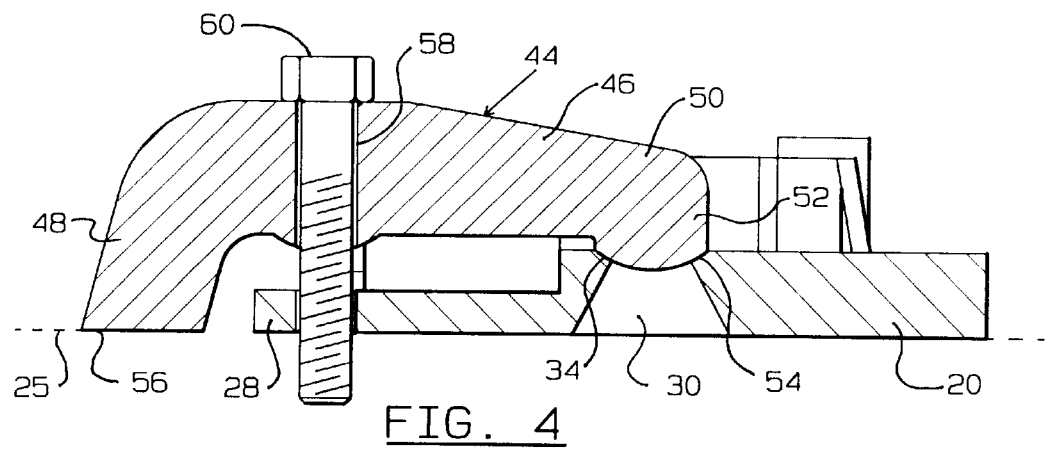
FIG. 4 is an elevational sectional view along Section 4—4 of FIG. 3 illustrating use of the adapter with a machinery mount in accord with the invention.

As will be appreciated from FIGS. 3 and 4, the bridge 48, and the associated leg portions, are obliquely related to the general length of the legs 46, and the bridge lower surface 56 is formed at an oblique angle as to be substantially parallel to the machinery mount supporting surface 25 when the adapter is used with the machinery mount as shown in FIG. 4. Holes 58 are defined in each of the legs 46 intermediate the legs free ends 50 and the bridge 48, and the holes 58 receive vertically oriented fasteners 60 which may be threaded into conventional concrete attaching systems. The base notches 28 provide clearance for the fasteners 60.

Upon tightening of the fasteners 60, the engagement of the bridge surface 56 with floor 25 will cause the tension in the fasteners 60 to impose a downward force upon the legs 46 which are received within the base recesses 34. In this manner, the base 20, and associated machinery mount 10, can be mechanically held against the machinery mount supporting surface even though the overhang of the supported machine may be too great to accommodate the convex washer system described with respect to FIGS. 1 and 2.

It is appreciated that various modifications to the inventive concepts may be apparent to those skilled in the art without departing from the spirit and scope of the invention.

I claim:

1. In a base for mounting machinery, in combination, a base having a lower supporting surface, an upper surface and spaced oblong mounting holes extending through the upper and lower surfaces, a spherical concave recess defined in the base upper surface intersecting the spaced mounting holes, a spherical fastener guide having a convex surface complementary in configuration to said spherical concave recess, and a pilot hole defined in said fastener guide extending therethrough in alignment with a base mounting hole whereby an elongated fastener extending through said pilot hole and base mounting hole obliquely to said lower supporting surface will be supported by said pilot hole and impose a force vector on said base perpendicular to the lower supporting surface.

2. In a base for mounting machinery wherein the base includes a lower supporting surface, an upper surface and spaced mounting holes extending through the upper and lower surfaces, the improvement comprising, a concave recess defined in the base upper surface, a U-shaped adapter having a pair of generally parallel legs interconnected by a bridge, each of said legs having an outer end, recess engaging means comprising a bulbous convex projection complementary in configuration to said concave recess defined on said legs' outer ends, and fastener receiving openings defined in said legs intermediate said legs' outer ends and said bridge, said bridge being angularly disposed to said legs, and a support engaging surface defined on said bridge whereby force applied to said adapter by fasteners extending through said fastener receiving openings will be imposed upon said legs' outer ends and the base.

* * * * *